(12) United States Patent
Eromäki

(10) Patent No.: US 7,158,634 B2
(45) Date of Patent: Jan. 2, 2007

(54) PORTABLE ELECTRONIC DEVICES

(75) Inventor: Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 663 days.

(21) Appl. No.: 10/021,922

(22) Filed: Dec. 13, 2001

(65) Prior Publication Data

US 2002/0077161 A1   Jun. 20, 2002

(30) Foreign Application Priority Data

Dec. 19, 2000   (FI) ................................. 20002785

(51) Int. Cl.
*H04M 1/00* (2006.01)

(52) U.S. Cl. ............................ 379/433.13; 379/433.12; 379/433.1; 455/575.1; 455/90.3; 361/681; 345/168

(58) Field of Classification Search ........... 379/433.13, 379/433.12, 433.1; 455/575.1, 90.3; 361/681; 345/168

See application file for complete search history.

(56) References Cited

U.S. PATENT DOCUMENTS 5,103,376 A * 4/1992 Blonder ...................... 361/681
5,200,913 A * 4/1993 Hawkins et al. ............ 361/681
5,494,447 A * 2/1996 Zaidan ......................... 439/31
5,584,054 A  12/1996 Tyneski et al. ............... 455/89
6,408,072 B1 * 6/2002 Fernandez-Martinez . 379/433.1
6,751,473 B1 * 6/2004 Goyal et al. ............. 455/575.1

FOREIGN PATENT DOCUMENTS

EP   1051012 A2   11/2000

* cited by examiner

*Primary Examiner*—Quynh H. Nguyen
(74) *Attorney, Agent, or Firm*—Perman & Green, LLP

(57) ABSTRACT

A portable electronic device (100) has a cover part (102) carrying a display (112) connected to a base part (104) carrying a keyboard (118) by means of a hinge arrangement (106). The cover part can move relatively to the base part from a closed configuration to an open configuration. The hinge arrangement comprises a plurality of elongate connecting elements (122, 124, 126, 128) connected at one end to the cover part and at another end to the base part. Each connecting element is relatively moveable about a first axis of rotation (134, 138) with respect to the cover part and relatively moveable about a second axis of rotation (136, 140) with respect to the base part. In moving from the closed configuration to the open configuration, the cover part is able to rotate about the first axis of rotation and move about the second axis of rotation.

18 Claims, 9 Drawing Sheets

PORTABLE ELECTRONIC DEVICES

FIELD OF THE INVENTION

The invention relates to portable electronic devices and is particularly, but not exclusively, related to mobile telephones.

BACKGROUND OF THE INVENTION

In recent times, numerous kinds of portable electronic devices have come into use. These include portable computers such as laptops, palmtops and electronic notebooks, mobile telephones, personal organisers and personal digital assistants (PDAs). Since it is undesirable for users to carry a number of such devices, it is becoming desirable for the devices to perform a greater number of functions. In this way, the traditional functions of telephony and computing are converging so that they can both be performed by a single device. It is for this reason that devices such as the Nokia 9110 Communicator have been developed.

One common form factor for such devices is as a two-part hinged arrangement. In a folded closed configuration a keyboard and a display, located on respective ones of the parts, are contained within the device. In an unfolded open configuration, the keyboard and the display are revealed and may be used. Such a form factor is used for laptops, electronic notebooks, personal organisers and the Nokia 9110 Communicator. In the closed configuration, the keyboard and the display face each other. This is desirable because it provides a ready way for them to be protected.

One problem with this form factor is that difficulties arise if the device is to be used in a closed configuration. Thus, in the case of the Nokia 9110 Communicator device, an additional keypad and display are provided on the outside of the device to enable it to be operated as a telephone in its closed configuration. Alternatively, it is known to provide such a device having a window in a part carrying a keypad so that at least part of a display can be visible whilst the device is in a closed configuration. U.S. Pat. No. 5,584,054 discloses such a device in which a keypad can be used to activate parts of a display when the device is in a closed configuration.

Another way to deal with this problem is to use an alternative form factor for such devices. An example of an alternative form factor is disclosed in EP 1 051 012. This shows a two-part device having a first part and a second part carrying a display and a keypad respectively which are slideably connected together. In this slide arrangement, at least part of the display may be protected by the part carrying the keypad in a closed configuration. A problem with such a slide arrangement is that there is always a degree of overlap between the first part and the second part when the display is uncovered and this limits the area which is available to be occupied by the display.

SUMMARY OF THE INVENTION

According to a first aspect of the invention there is provided a portable electronic device having a first part carrying a first user interface and a second part carrying a second user interface, the first and second parts being relatively moveable from a closed configuration to an open configuration the first part being relatively moveable with respect to a connecting element about a first axis of rotation and the connecting element being relatively moveable with respect to the second part about a second axis of rotation so that the first part is able to rotate about the first axis of rotation and move about the second axis of rotation.

In this way, the first part may be able to move both translationally and rotationally with respect to the second part.

Preferably one of the rotational axes is able to move about the other of the rotational axes.

Preferably the first part has an inner surface and an outer surface. Preferably the first part is an upper part. This may be a front or cover part. Preferably, at the outer surface of the first part there is provided one or more of the following user interface elements: a display, a keypad, a combination of a keypad and a display and a touch-sensitive screen. Preferably, these user interface elements are elements for a cellular mobile telephone (CMT).

Preferably at the inner surface of the first part there is provided one or more of the following user interface elements: a display, a keypad, a combination of a keypad and a display and a touch-sensitive screen. Preferably, these user interface elements are elements for a PDA.

Preferably the second part has an inner surface and an outer surface. Preferably the second part is a lower part. This may be a back or base part. Preferably, at the outer surface of the first part there is provided one or more of the following user interface elements: a display, a keypad or one or more user operable keys, a combination of a keypad and a display and a touch-sensitive screen. Preferably, these user interface elements are elements for a CMT or a PDA.

Preferably at the inner surface of the second part there is provided one or more of the following user interface elements: a display, a keypad, a combination of a keypad and a display and a touch-sensitive screen. Preferably, these user interface elements are elements for a PDA.

Preferably, in the closed configuration, the outer surfaces of the first part and the second part form an outer surface of a casing of the device. Preferably, in the closed configuration, second user interface is contained in the casing and the first user interface is present at its outer surface.

Since the first part is able to move translationally with respect to the second part, it is able to move from a position in which it at least partly covers the second part, and particularly at least partly covers the second user interface of the second part (the closed configuration), to a position in which it does not cover the second part (the open configuration). It is preferred that the second user interface cannot be used in the closed configuration or at least that its use is limited. It is preferred that the second user interface can be used in the open configuration.

In contrast to the prior art, the combination of translational and rotational movement enables a display present at the outer surface of a device according to the prior art to be used in conjunction with a keyboard located at the inner surface of the device by a user. In this way, the same display can be used irrespective of whether the device is in the first configuration or the second configuration. Furthermore, since the first part is able to rotate about the first axis, it is able to rotate so that both the first user interface and the second user interface can adopt a preferred optimum configuration in which they are both visible to, and available for use by, the user at the same time. This optimum configuration is when there is an included angle of 180° or less between the first part and the second part. Preferably the included angle is in the range 90° to 140°. Most preferably, it is in the region of 130°.

Preferably the first part and the connecting element are connected by a pin about which the connecting element can rotate. Preferably the second part and the connecting element are connected by a pin about which the connecting element can rotate.

Preferably the first part and the second part are connected at least by one pair of connecting elements. The connecting elements may be connected at connection points on the first part and the second part. Preferably, one pair of connecting elements is on a first side of the first part and the second part and another pair of connecting elements is on a second opposing side of the first and second parts. Preferably the distances between the connection points for the connecting elements in each pair are different. Preferably, on a common side of the first part and the second part, the connection points on the parts are separated by different amounts.

Having a pair of connecting elements separated from each other may provide that the first part and the second part remain substantially parallel during an initial stage of their relative movement whilst the device is changing from the closed configuration to the open configuration. Having a difference in the lengths of the connecting elements, in the separation of their connection points or in both provides the first part with a greater rotational movement during a later stage of the movement of the first part relative to the second part. In this way, although the first part moves about the second axis of rotation, since the first part and the second part are substantially parallel during the initial stage of their relative movement this is effectively a translational movement. Thus, the first part is able to have an initial mainly translational movement relative to the second part and a later mainly rotational movement about the first axis of rotation. It should be noted that the translational movement is not exclusively in one direction but may also have a component of movement in a perpendicular direction.

Preferably at least some of the connecting elements are in the form of a first straight portion connected to a second straight portion at an elbow region so that the overall configuration of the connecting elements is "bent". Preferably one connecting element from each pair has such an elbow configuration.

Preferably, when the device is in the open configuration and resting on a surface, the elbow regions of the connecting elements engage the surface and thus assist in supporting the device in an upright orientation, that is with the first part supported above the surface and the second part resting on the surface.

Preferably the first user interface is a display. It may be a touch-sensitive screen. Preferably the second user interface is a keypad. Preferably the keypad is a keyboard. Preferably it is a QWERTY format keyboard.

Preferably the portable electronic device is selected from a group consisting of a laptop, an electronic notebook, a palmtop, a mobile telephone, a personal organiser and a personal digital assistant.

According to a second aspect of the invention there is provided a portable electronic device having a first part carrying a display and a second part carrying a keypad, the first and second parts being relatively moveable from a closed configuration to an open configuration in the closed configuration the display being uncovered and available for use by a user and the keypad being covered by the first part characterised in that in the open configuration the keypad is uncovered and both the display and the keypad are presented to the user so that they are available for use by the user at the same time.

A device according to the invention is able to maximise the area available on which a keypad or keyboard may be provided whilst providing an arrangement in which a display can readily be used both in both open and closed configurations. This is especially useful if the device is to be very small, for example if it is to be a wrist mounted device such as a wrist phone.

BRIEF DESCRIPTION OF THE DRAWINGS

The invention will now be described by way of example only with reference to the accompanying drawings in which.

DETAILED DESCRIPTION

Figure 1A:
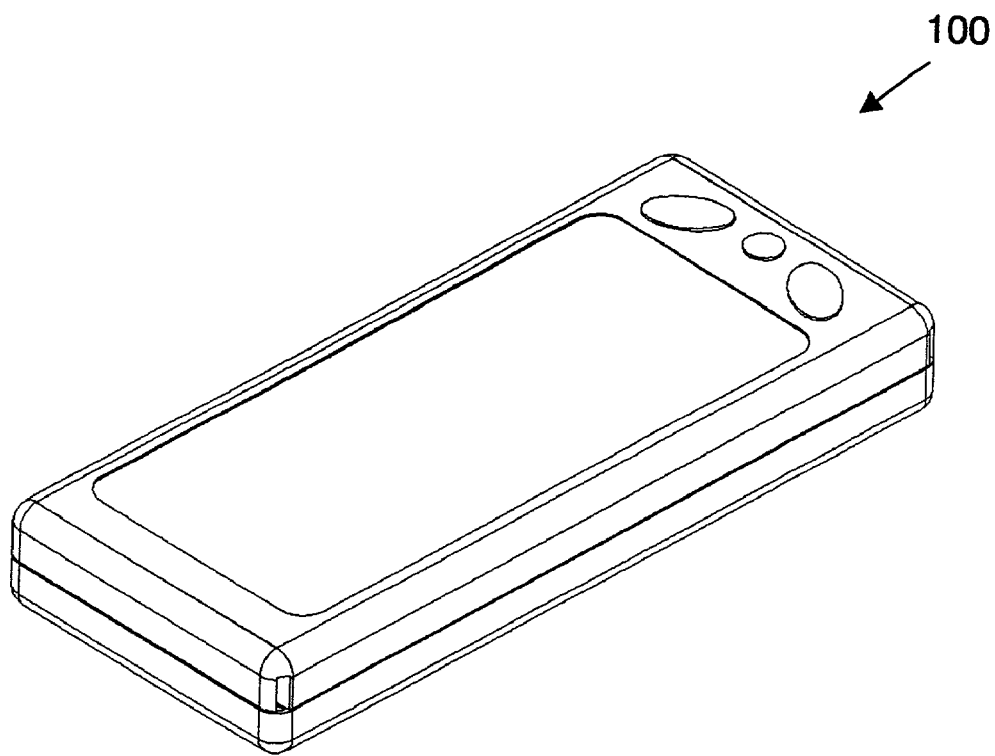
FIGS. 1a to 1d show isometric views of steps involved in opening a device according to the invention.
Figure 1B:
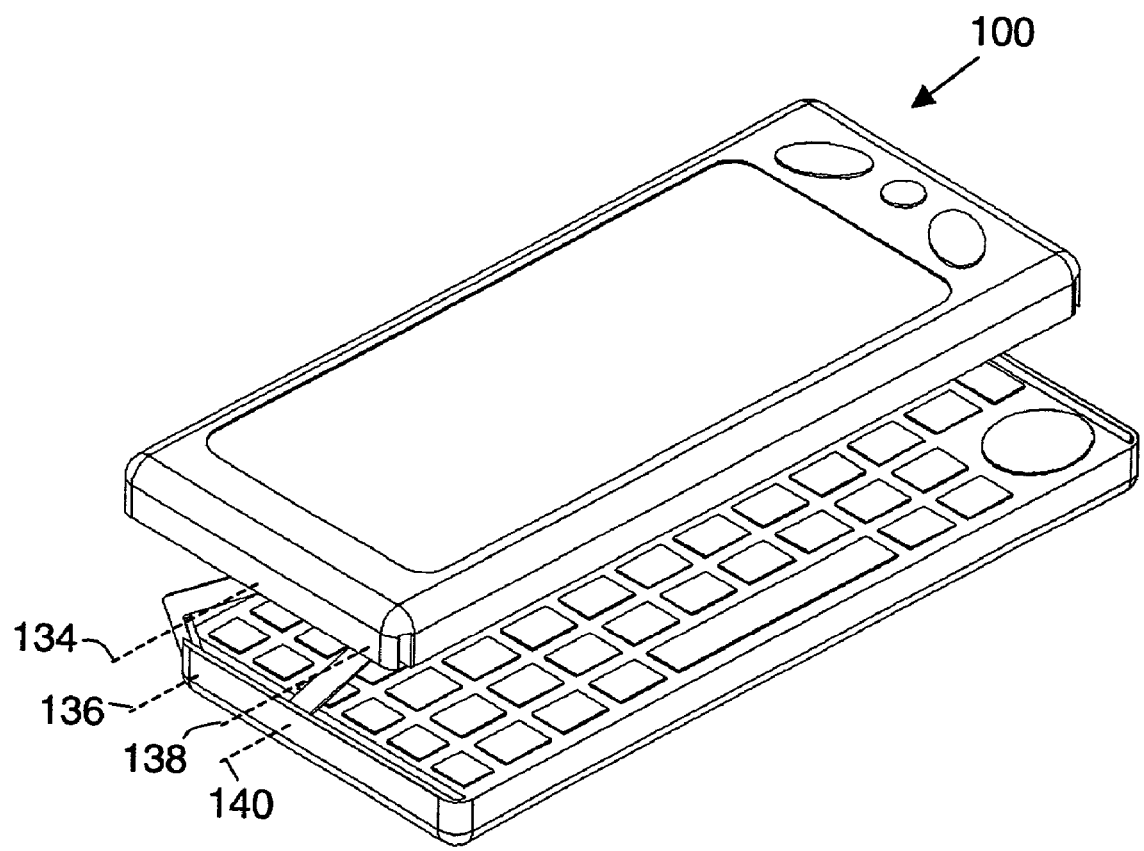
Figure 1C:
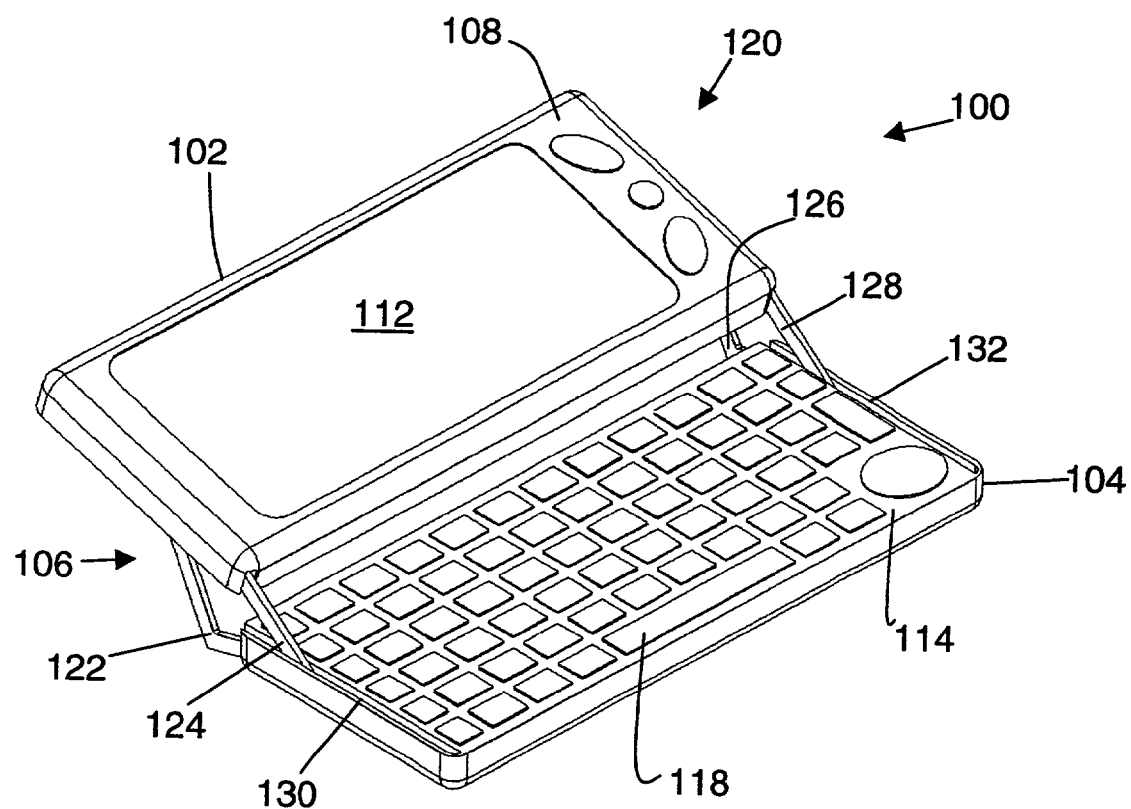
Figure 1D:
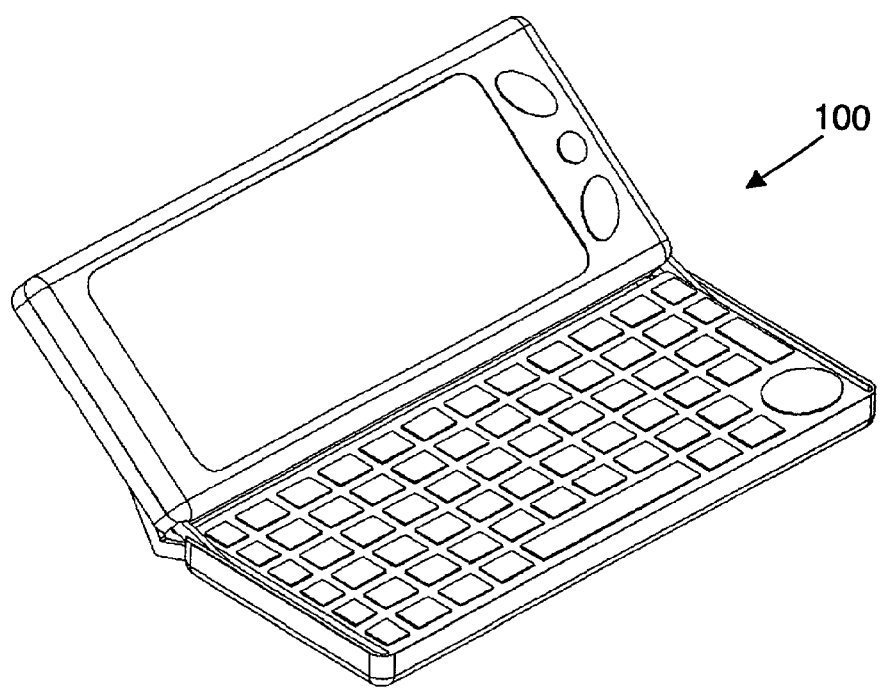

FIGS. 1a to 1d show a combined mobile telephone and PDA device 100. The device 100 can adopt a folded closed configuration (FIG. 1a) and an unfolded open configuration (FIG. 1d). Features of the device 100 will now be explained by referring to FIG. 1c. The device 100 has a first part 102 and a second part 104 joined by a hinge arrangement 106. The first part 102 has an upper surface 108 and a lower surface 110 which faces the second part 104 when the device 100 is in the closed folded configuration. The upper surface 108 carries a display 112. The second part 104 has an upper surface 114 and an opposing lower surface 116. The upper surface 114 faces the first part 104 when the device 100 is in the closed folded configuration. The upper surface 114 carries a keyboard 118 having alphabetical keys in a QWERTY format, numerical keys and keys to carrying out functions, such as telephony or PDA functions.

The first part 102 is primarily a CMT unit and the second part is primarily a PDA unit. The first part 102 comprises a processor, static and dynamic memory, a baseband/radio frequency (RF) part including a transceiver, an antenna, a speaker and a microphone and any other necessary hardware and software to enable it to carry out wireless telephony operations. Thus, it may also comprise a phonebook, hardware and software to carry out normal call functions (SEND and END) and to send, receive and display emails, faxes and images. The first part 102 also comprises a recess within which a subscriber identity module (SIM) can be located and a suitable reading/writing device to enable the processor to read data from, and write data to, the SIM. The first part 102 also comprises a battery and power control and power supply circuitry to provide power to the first part and the second part. The second part comprises a processor, static and dynamic memory and any other necessary hardware and software to enable it to carry out PDA operations. This may include providing calendar functions, games and notepads. The first part 102 and the second part 104 also comprise user interface elements as has been described in the foregoing and will be described further in the following. Functionality of the two processors may be integrated so that only a single processor is needed.

A set of keys 120 is adjacent to the display 112 and can be used to operate the device as a PDA in combination with the display 112. In addition to an on/off key and a cursor key, other keys are provided to enable access to be obtained to various functions and applications such as an address book, a diary, writing memos and a to do list. The set of keys 120 can be used in combination with the display 112 to dial telephone numbers, for example by selecting telephone numbers already stored in a memory of the device or by selecting a sequence of individual numbers from the display 112.

In the closed configuration the device 100 is primarily useable as a mobile telephone. In the open configuration the device 100 can be used either as a mobile telephone (particularly in a hands-free arrangement) and as a PDA. If the device 100 is being used as a PDA in the open configuration, the keyboard is accessible and use of the PDA functions becomes more flexible and easier. In either configuration, the same PDA applications and the same information stored within the device 100 are used.

Figure 2A:
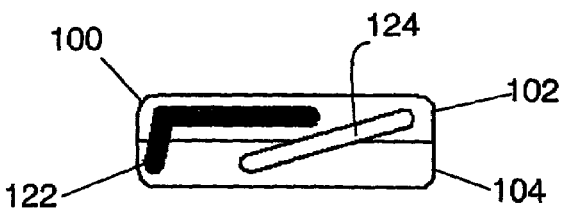
FIGS. 2a to 2e show schematic side views of the device as these steps occur.
Figure 2B:
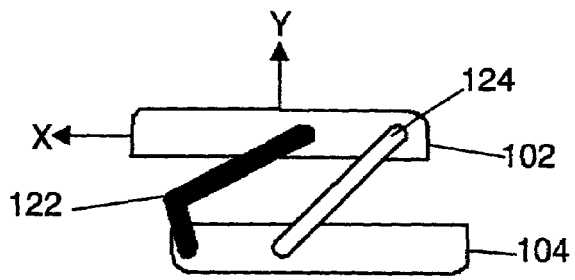
Figure 2C:
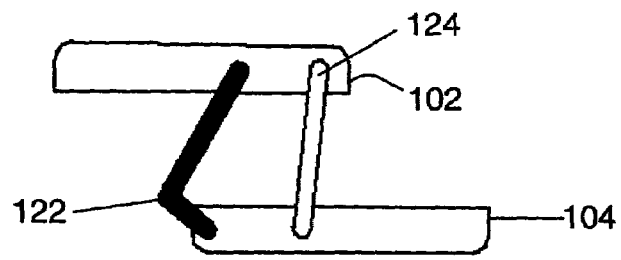

Opening and closing of the device 100 will now be explained by referring to FIGS. 1a to 1d in combination with FIGS. 2a to 2e. It can be seen that FIGS. 1a and 2a, FIGS. 1b and 2b, FIGS. 1c and 2d and FIGS. 1d and 2e all correspond. FIG. 2c has no correspondence in FIGS. 1a to 1d.

Corresponding sides of the first part 102 and the second part 104 are connected by pairs of connecting elements 122 and 124 and 126 and 128. In each pair of the connecting elements, one of the connecting elements, 122 and 126, is in a bent or angled form and has an elbow. Each connecting element is connected at one of its ends to the first part 102 and at the other of its ends to the second part 104 at connection points so that the connecting elements can rotate relatively to the first part 102 and the second part 104 about axes of rotation 134, 136, 138 and 140.

As can be seen in FIGS. 1b, 1c and 1d, the pairs of connecting elements, 122 and 124 and 126 and 128, fit into slots 130 and 132 provided in the sides of the first part 102. In FIGS. 2a to 2d, detail of the slots 130 and 132 and accommodation of the connecting elements within them has been omitted for clarity. Corresponding slots are provided in the sides of the second part 104 as will be described in the following in relation to FIG. 4.

There are certain significant features concerning the connecting elements which should be noted. These features can be seen most clearly in FIGS. 2a to 2e. The distances between connection points for the connecting elements in each pair, 122 and 124 and 126 and 128, are different. On a common side of the first part 102 and the second part 104, the connecting points at which the connecting elements are connected are separated by different amounts.

Figure 2D:
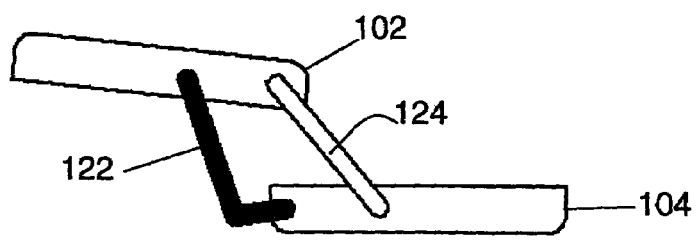

Opening of the device 100 will now be described. In a preferred embodiment, the device 100 has a latch mechanism to prevent it from opening accidentally. Once the latch mechanism is released, the device 100 can be opened. FIG. 2a shows the device 100 in a closed configuration. In FIG. 2b, the first part 102 and the second part 104 are forced apart by a user and the first part 102 moves largely in a direction Y. However, it also moves to some extent in a translational direction X. In FIG. 2c, the separation in the Y direction of the first part 102 and the second part 104 is approximately at a maximum (determined mainly by the length of connecting elements 124 and 128) but the movement in the X direction continues. In FIG. 2d, the movement in the X direction is nearing its maximum (again determined mainly by the length of the connecting elements 124 and 128) and then any further movement of the first part 102 is largely a rotational movement about the connection points by which it is connected to the connecting elements 122 and 126.

It should be noted that although the two parts are initially substantially parallel whilst in the closed configuration (FIG. 2a), as their translational offset in the X direction increases, the combination in the difference in the distance between connection points in respective connecting elements in the pairs and the difference in the amount of separation of the connecting points causes the first part 102 to become inclined relatively to the second part 104 to a greater extent. The degree of the inclination is controlled by the differences in the distances and the separations. The limit of this inclination is determined by a suitable stopping arrangement.

Figure 2E:
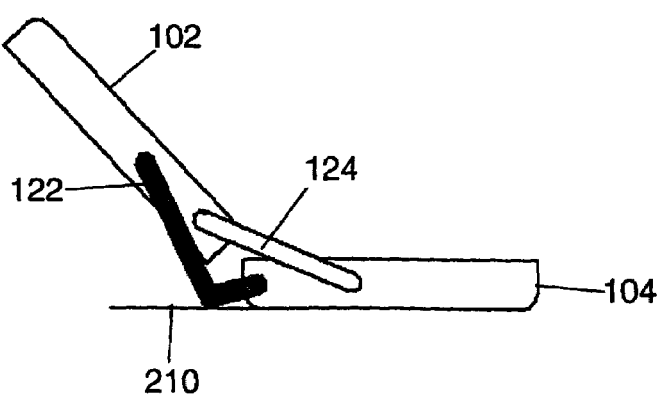
Figure 3A:
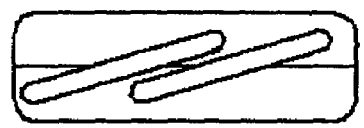
FIGS. 3a to 3e show schematic side views of a device according to another embodiment of the invention as it is being opened.
Figure 3B:
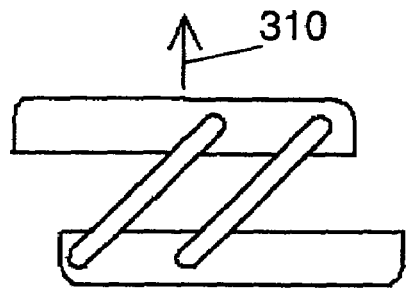
Figure 3C:
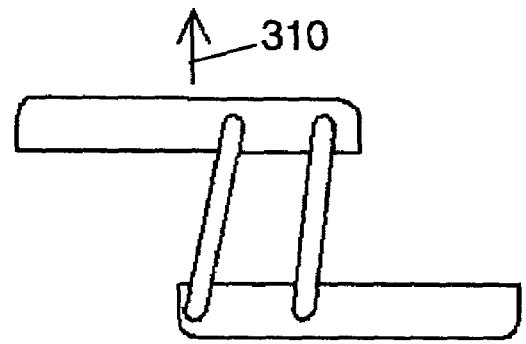
Figure 3D:
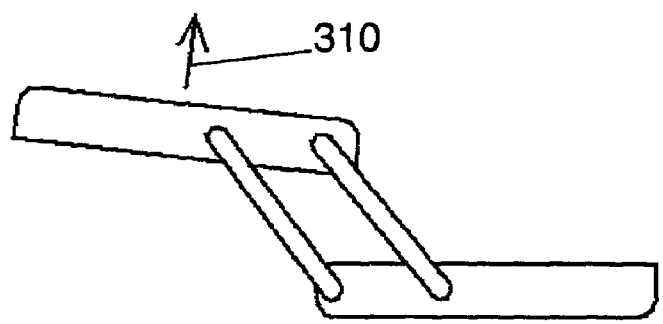
Figure 3E:
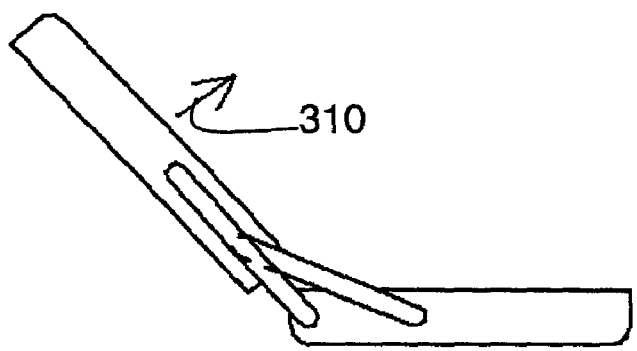

The effect of using the connecting elements 122 and 126 which have an elbow can be seen in FIGS. 1d and 2e. The inclination of the first part 102 is stopped at a point at which the elbows of the connecting elements 122 and 126 rest on a flat surface 210 on which the second part rests when the device 100 is in the open configuration. In this way, the connecting elements 122 and 126 help support the device when it is in the open configuration and prevents it from toppling over backwards. Thus, it is not so necessary to minimise the weight of the first part 102.

FIGS. 3a to 3e show schematic side views of a device according to another embodiment of the invention as it is being opened. In this embodiment, straight connecting elements are provided. The effect of using a combination of a difference in length in respective pairs of the connecting elements and a difference in the amount of separation of connecting points can be seen. The display orientation is also shown in FIGS. 3b to 3e by means of an arrow 310.

Closing of the device 100 occurs in a reverse sequence of steps to those described in the foregoing.

Figure 4:
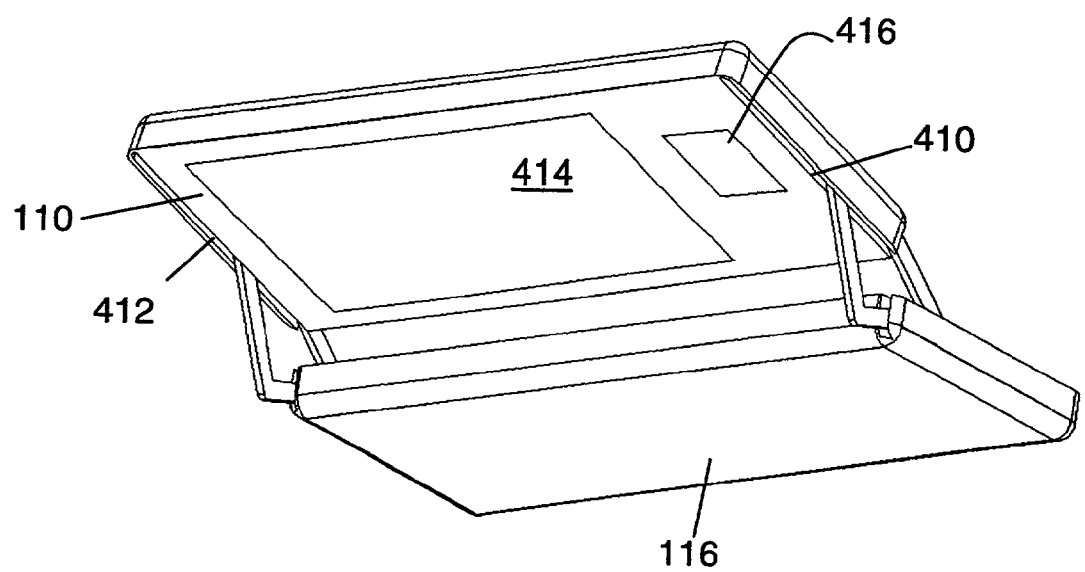
FIG. 4 shows another view of the device according to FIGS. 1a to 1d.

FIG. 4 shows another view of the device 100 according to FIGS. 1a to 1d. This is an isometric view from beneath the device showing its underside. This shows the lower surfaces 110 and 116 and slots 410 and 412 for accommodating respective pairs of the connecting elements 122 and 124 and 126 and 128 when the device 100 is in a closed configuration. In addition FIG. 4 shows suitable locations to accommodate a battery and a SIM. The locations are shown by covers 414 and 416 which would respectively cover recesses to accommodate the battery and the SIM.

Figure 5A:
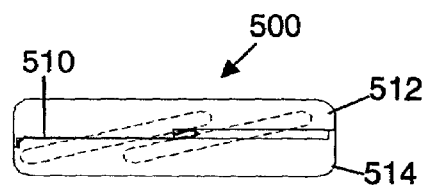
FIGS. 5a to 5c show steps involved in opening of a device according to yet another embodiment of the invention.
Figure 5B:
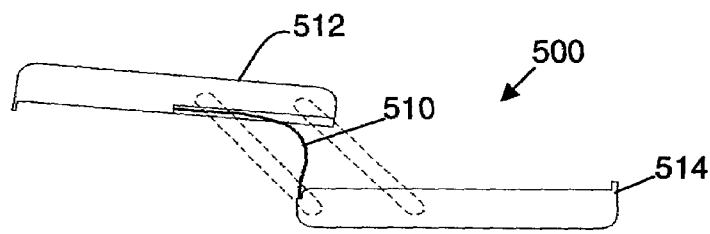
Figure 5C:
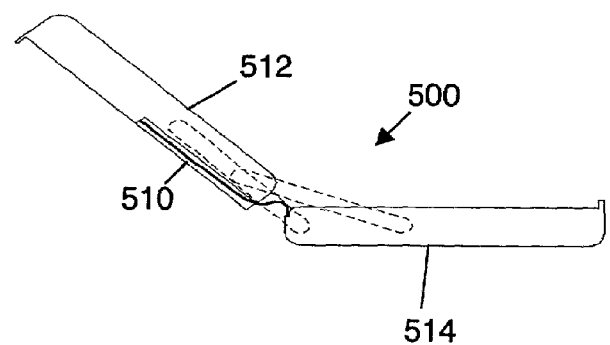

FIGS. 5a to 5c show steps involved in opening of a device 500 according to yet another embodiment of the invention. The general opening procedure is similar to that described in FIGS. 1a to 1d and 2a to 2e and is not repeated here. The main difference to note is a cable 510 or some other suitable means, which is used to convey electrical power and electrical signals between a first part 512 and a second part 514. The cable 510 is terminated at each end with a flexing-tolerant connector with which it is connected to respective ones of the first and second parts 512 and 514. Additionally or alternatively the cable can twist and turn itself and thus can accommodate whatever torsional strain is applied. In this case, flexing-tolerant connectors do not have to be used. It should be noted that the first part 512 is provided on its underside with a recess 516 into which the cable 510 can be received when the device 500 is in the open configuration. In this embodiment, the cable 510 is largely unconstrained except at its ends.

Figure 6:
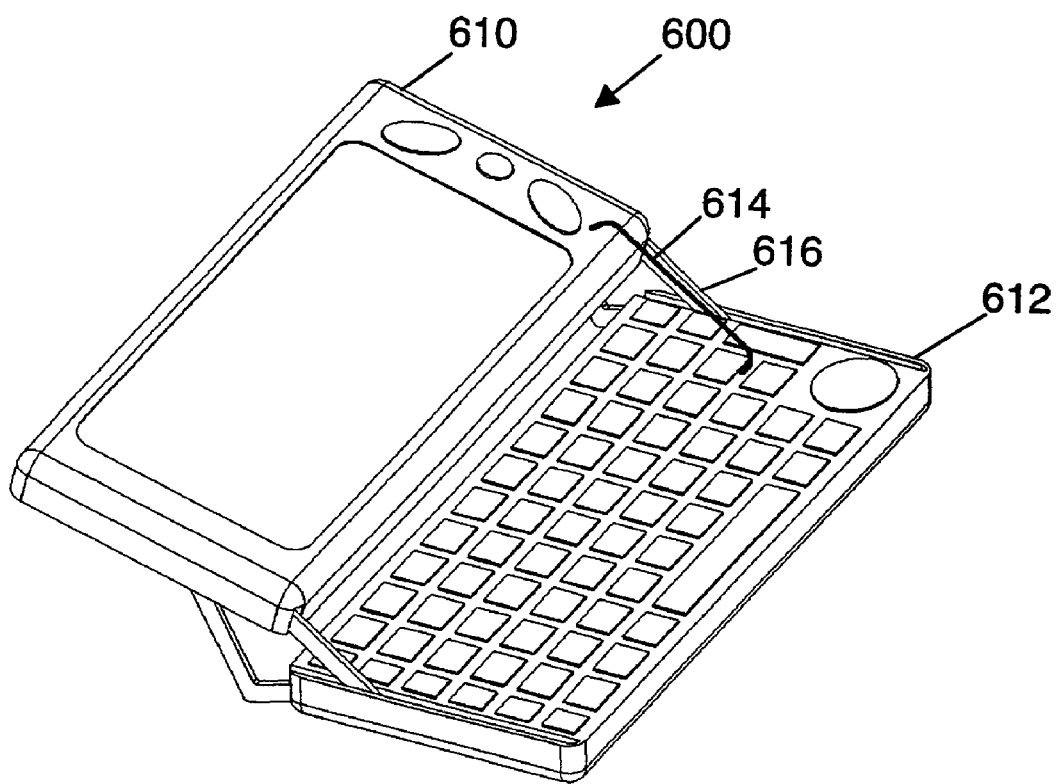
FIG. 6 shows yet still another embodiment of the invention.

FIG. 6 shows a device 600 according to yet still another embodiment of the invention. In common with FIG. 5, this also deals with electrical connection between a first part 610 and a second part 612. In this embodiment a cable 614 is connected to a connecting element 616. In another embodiment the cable 614 is otherwise associated with the connecting element 616, for example the cable 614 may be contained within it.

Rather than having a physical connection between the first part and the second part, they may be connected by a wireless link, for example by a low power radio frequency (LPRF) link or by a Bluetooth link. In this case, the first part and the second part are each provided with a suitable transceiver. In case a Bluetooth transceiver is provided in each part, then a power source such as a battery may be provided in each part. If a wireless link is provided, it is preferred that either one of the parts is disengageable from the connecting elements and be used (for example handheld) whilst the other part is in another, perhaps more secure, location. In this way, the parts can still be in wireless communication with each other.

Although in the foregoing, opening and closing of devices has been described in which force is applied by hand, in another embodiment, a spring-loaded mechanism is provided which provides the necessary force to open a device. In such a device, when hand force is used to close the device, the spring-loaded mechanism stores energy and then on release of a release mechanism, the stored energy is used to open the device. Alternatively, the device may be provided with an electric motor and suitable power source to provide the force to open and close the device.

Although in the foregoing, the first part and the second part have been described as being approximately the same size and meeting together in order provide a closed casing of the device, the first part or the second part may actually partly enclose the other part when the device is in its closed configuration. In this embodiment, one part is provided with walls which partly or wholly cover the sides of the other part. One particular embodiment is a box construction in which one part slides into the other part. In these embodiments, it is convenient if the connecting elements are also enclosed.

Although the invention has been described as a portable device, in another embodiment it is not portable but may be adapted to be used in a fixed location. For example, the device may be a desktop computer or part of an entertainment system, for example part of a music playing system. Those skilled in the art will understand that the invention may be applied to devices in which one user interface element should be readily available and another user interface element available depending on whether the device is in an open or a closed configuration.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

What is claimed is:

1. A portable electronic device having a first part carrying a first display interface and a second part carrying a second user input interface, the first and second parts being relatively moveable from a closed configuration to an open configuration, said first and second parts being connected by first and second pairs of connecting elements, the first pair of connecting elements being connected to a first side of the first and second parts and the second pair of connecting element being connected to a second side of the first and second parts, each end of each connecting element being connected to be simultaneously rotatable about respective rotational axes, wherein the respective rotational axes of the first pair are in common with the corresponding rotational axes of the second pair.

2. A portable electronic device according to claim 1 wherein the first part is able to move both translationally and rotationally with respect to the second part.

3. A portable electronic device according to claim 1 wherein the one of the rotational axes is able to move about the other of the rotational axes.

4. A portable electronic device according to claim 1 wherein the first part is a front part.

5. A portable electronic device according to claim 1 wherein the second part is a back part and the second user input interface comprises a keypad.

6. A portable electronic device according to claim 1 wherein the first display interface and the second user input interface are able to move into a preferred optimum configuration in which they are both visible to, and available for use by, a user at the same time.

7. A portable electronic device according to claim 1, wherein at least some of the connecting elements are in the form of a first straight portion connected to a second straight portion at an elbow region.

8. A portable electronic device according to claim 1 wherein the connecting elements are connected at connection points on the first part and the second part.

9. A portable electronic device according to claim 8 wherein each pair of connecting elements are connected on a common side of the first part and the second part and the connection points on the parts are separated by different amounts.

10. A portable electronic device according to claim 9 wherein having a difference in the separation of their connection points provides the first part with a greater rotational movement during a later stage of its movement relative to the second part.

11. A portable electronic device according to claim 1 wherein the distances between the connection points for the connecting elements in each pair are different.

12. A portable electronic device according to claim 11 wherein having a difference in the lengths of the connecting elements provides the first part with a greater rotational movement during a later stage of its movement relative to the second part.

13. A portable electronic device according to claim 1 wherein in moving from the closed configuration to the open configuration, the first part and the second part remain substantially parallel during an initial stage of their relative movement.

14. A portable electronic device according to claim 1 selected from a group consisting of a laptop, palmtop, an electronic notebook, a mobile telephone, a personal organiser and a personal digital assistant.

15. A portable electronic device according to claim 7 wherein the at least some of the connecting elements are connected at connection points on the first part and the second part.

16. A portable electronic device having a first part carrying a first display interface and a second part carrying a second user input interface, the first and second parts being relatively moveable from a closed configuration to an open configuration, the first and second parts being connected by pairs of connecting elements, the first pair of connecting elements being connected to a first side of the first and second parts and the second pair of connecting elements being connected to a second side of the first and second parts, each end of each connecting element being connected to be simultaneously rotatable about respective rotational axes, wherein the respective rotational axes of the first pair are in common with the corresponding rotational axes of the second pair, the pairs of connecting elements being attached to the first part and the second part in such a way that the first part is constrained by its relative movement to the connecting elements such that it has a greater rotational movement during a later stage of the movement if the first part relative to the second part from the closed configuration to the open configuration.

17. A portable electronic device having a first part carrying a first display interface and a second part carrying a second user input interface, the first and second parts being relatively moveable from a closed configuration to an open configuration, the first and second parts being connected by a pairs of connecting elements, the first pair of connecting elements being connected to a first side of the first and second parts and the second pair of connecting elements being connected to a second side of the first and second parts, each end of each connecting element being connected to be simultaneously rotatable about respective rotational axes, wherein the respective rotational axes of the first pair are in common with the corresponding rotational axes of the second pair, respective ones of the pairs of connecting elements being in the form of a first straight portion connected to a second straight portion at an elbow region, the elbow regions serving to engage a surface on which the device sits and thus assists in supporting the device in an upright orientation.

18. A portable electronic device comprising first and second housings carrying respective display and user input interfaces, the first and second housings being configured to be relatively moveable between opened and closed configurations, the first and second parts being connected by respective first and second pairs of means for connecting, the first pair of means for connecting being connected to a first side of the first and second housings, and the second pair of means for connecting being connected to a second side of the first and second housings, each of the means for connecting being connected to respective first and second housings to be simultaneously rotatable about respective rotational axis, wherein the respective rotational axis of the first pair of means for connecting are in common with the corresponding rotational axis of the second pair of means for connecting.

* * * * *